United States Patent
Somogyi et al.

(10) Patent No.: US 9,967,324 B2
(45) Date of Patent: May 8, 2018

(54) SYSTEM AND METHOD FOR PROVIDING DATA SOURCES FOR USE IN A MULTITENANT APPLICATION SERVER ENVIRONMENT

(71) Applicant: ORACLE INTERNATIONAL CORPORATION, Redwood Shores, CA (US)

(72) Inventors: Alexander Somogyi, Basking Ridge, NJ (US); Stephen Felts, Denville, NJ (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 280 days.

(21) Appl. No.: 14/857,451

(22) Filed: Sep. 17, 2015

(65) Prior Publication Data

US 2016/0094403 A1 Mar. 31, 2016

Related U.S. Application Data

(60) Provisional application No. 62/055,853, filed on Sep. 26, 2014.

(51) Int. Cl.
G06F 15/173 (2006.01)
H04L 29/08 (2006.01)
G06F 9/50 (2006.01)

(52) U.S. Cl.
CPC .......... H04L 67/10 (2013.01); G06F 9/5077 (2013.01)

(58) Field of Classification Search
CPC .............................. G06F 9/5077; H04L 67/10
See application file for complete search history.

(56) References Cited

U.S. PATENT DOCUMENTS

| 9,317,706 B2* | 4/2016 | Kaushik | G06F 21/6209 |
| 2011/0213870 A1 | 9/2011 | Cal | |
| 2012/0054720 A1* | 3/2012 | Klein | G06F 9/44505 717/125 |
| 2012/0072597 A1 | 3/2012 | Teather | |
| 2012/0110566 A1 | 5/2012 | Park | |
| 2012/0166488 A1* | 6/2012 | Kaushik | G06F 21/6209 707/795 |

(Continued)

OTHER PUBLICATIONS

European Patent Office, International Searching Authority, International Search Report and Written Opinion dated Apr. 24, 2015 for International Application No. PCT/US2015/012268 , 10 Pages.

*Primary Examiner* — Mohamed A Wasel
(74) *Attorney, Agent, or Firm* — Tucker Ellis LLP

(57) ABSTRACT

In accordance with an embodiment, an application server environment can include a plurality of partitions and a resource group template, which can be referenced by a resource group in one or more of the plurality of partitions. A data source configuration can be defined as part of the resource group template. The data source configuration can be overridden with attributes specific to a particular referencing partition. A data source subsystem can create a data source object in accordance with the overridden data source configuration, for use in creating connections to a database associated with the particular referencing partition, monitoring and diagnosing the data source object.

20 Claims, 9 Drawing Sheets

(56) References Cited

U.S. PATENT DOCUMENTS

| | | | | |
|---|---|---|---|---|
| 2014/0068568 A1* | 3/2014 | Wisnovsky | ......... | G06F 11/3636 717/128 |
| 2014/0143276 A1* | 5/2014 | Rogers | .............. | G06F 17/30539 707/776 |
| 2014/0164933 A1* | 6/2014 | Eberlein | ................ | G06Q 10/04 715/736 |
| 2015/0304389 A1* | 10/2015 | Chiussi | ................ | H04W 4/003 709/203 |

* cited by examiner

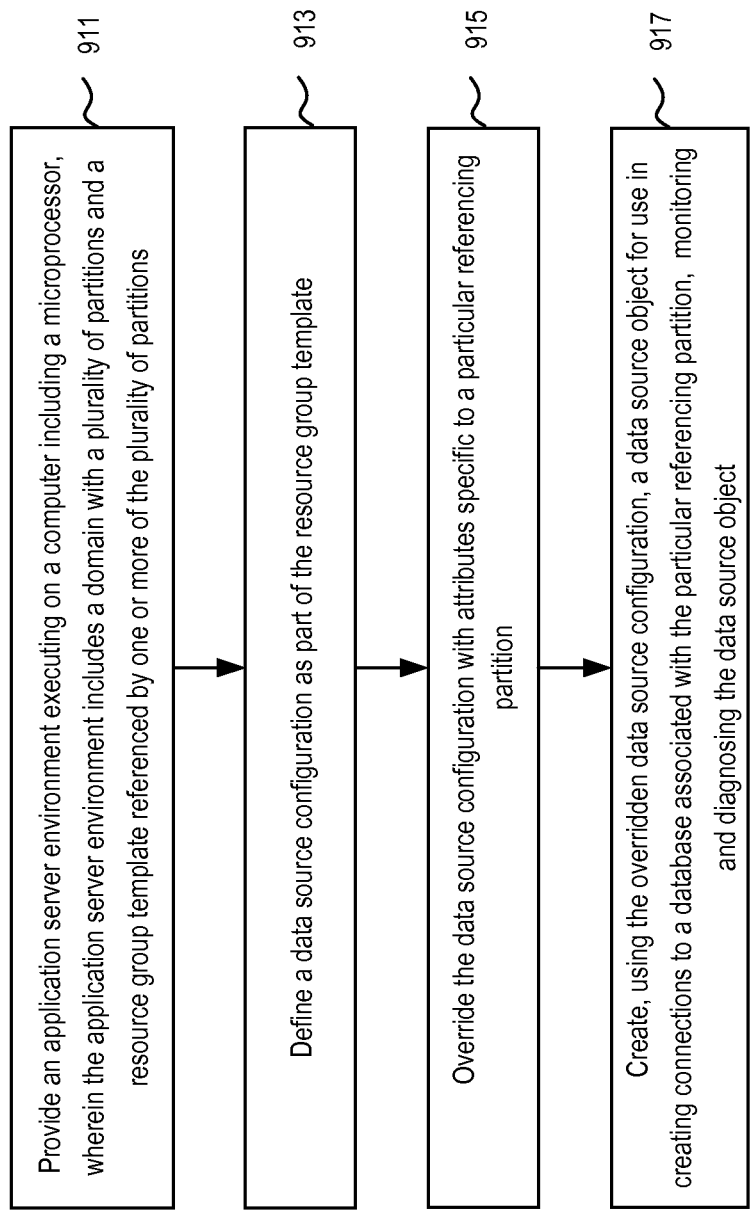

SYSTEM AND METHOD FOR PROVIDING DATA SOURCES FOR USE IN A MULTITENANT APPLICATION SERVER ENVIRONMENT

CLAIM OF PRIORITY AND CROSS-REFERENCE TO RELATED APPLICATIONS

This application claims the benefit of priority to U.S. Provisional Application titled "SYSTEM AND METHOD FOR DATA SOURCE IN A MULTITENANT APPLICATION SERVER ENVIRONMENT", Application No. 62/055,853, filed Sep. 26, 2014; and is related to U.S. Provisional Application titled "SYSTEM AND METHOD FOR SUPPORTING MULTITENANCY IN AN APPLICATION SERVER, CLOUD, OR OTHER ENVIRONMENT", Application No. 61/929,888, filed Jan. 21, 2014; and U.S. Patent Application titled "SYSTEM AND METHOD FOR SUPPORTING MULTI-TENANCY IN A APPLICATION SERVER, CLOUD, OR OTHER ENVIRONMENT", application Ser. No. 14/601,883, filed Jan. 21, 2015; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and cloud environments, and are particularly related to a system and method for providing data sources for use in a multitenant application server environment.

BACKGROUND

Software application servers, examples of which include Oracle WebLogic Server (WLS) and Glassfish, generally provide a managed environment for running enterprise software applications. Recently, technologies have also been developed for use in cloud environments, which allow users or tenants to develop and run their applications within the cloud environment, and to take advantage of distributed resources provided by the environment. As such, application resources, for example data sources, in a traditional application server environment may have to be modified for such a cloud environment.

SUMMARY

In accordance with an embodiment, described herein is a system and method for providing data sources in a multi-tenant application server environment. The system includes a an application server environment with a plurality of partitions and a resource group template referenced by a resource group in one or more of the plurality of partitions; and a data source configuration defined as part of the resource group template. The data source configuration can be overridden with attributes specific to a particular referencing partition. A data source subsystem can create a data source object in accordance with the overridden data source configuration, for use in creating connections to a database associated with the particular referencing partition, monitoring and diagnosing the data source object.

BRIEF DESCRIPTION OF THE FIGURES

FIG. 9 illustrates a method for providing data sources for use in an application server, cloud, or other environment, in accordance with an embodiment.

DETAILED DESCRIPTION

Multi-tenancy can reduce administrative overhead associated with managing multiple domains and application deployments, and improve density of deployments, such that operational and infrastructure costs are reduced. As heavily used application resources, data sources need to support partition-based configuration, runtime monitoring, security, diagnostics, etc. to meet the general goals of multi-tenancy.

In accordance with an embodiment, described herein is a system and method for providing data sources in a multi-tenant application server environment. The system includes a an application server environment with a plurality of partitions and a resource group template referenced by a resource group in one or more of the plurality of partitions; and a data source configuration defined as part of the resource group template. The data source configuration can be overridden with attributes specific to a particular referencing partition. A data source subsystem can create a data source object in accordance with the overridden data source configuration, for use in creating connections to a database associated with the particular referencing partition, monitoring and diagnosing the data source object.

Application Server (e.g., Multi-Tenant, MT) Environment

Figure 1:
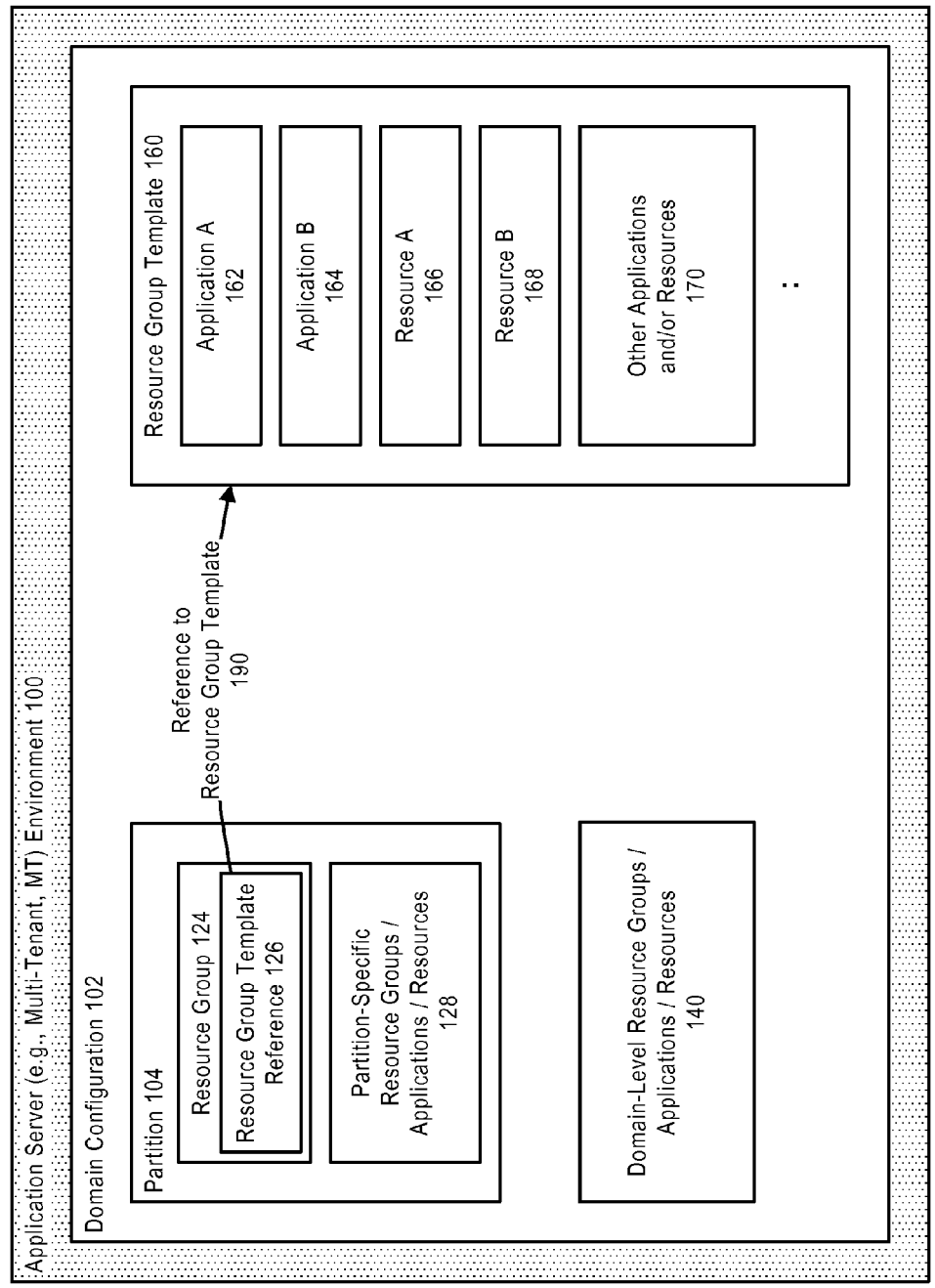
FIG. 1 illustrates a system for supporting multi-tenancy in an application server, cloud, or other environment, in accordance with an embodiment.

FIG. 1 illustrates a system for supporting multi-tenancy in an application server, cloud, or other environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
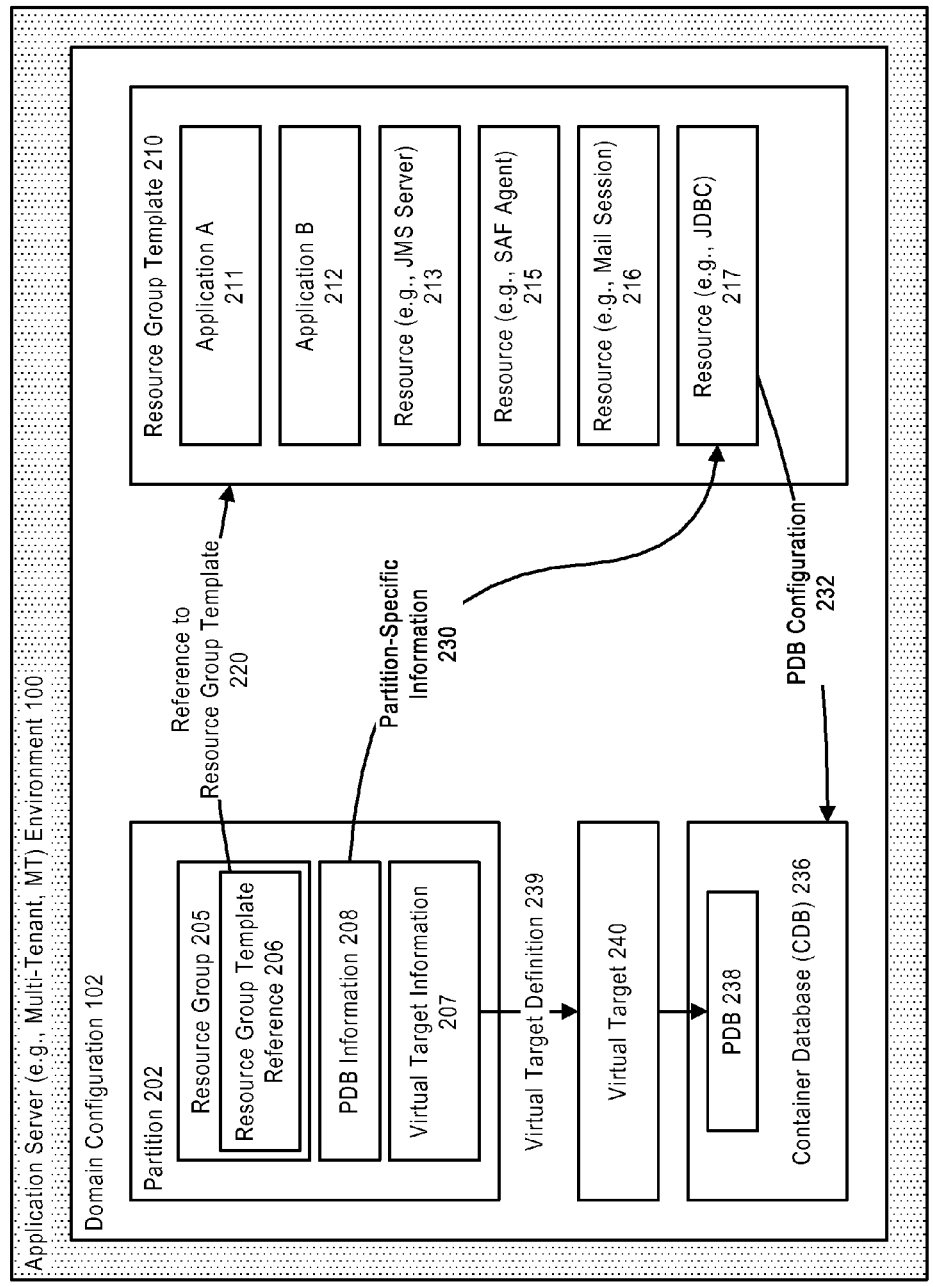
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when a resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
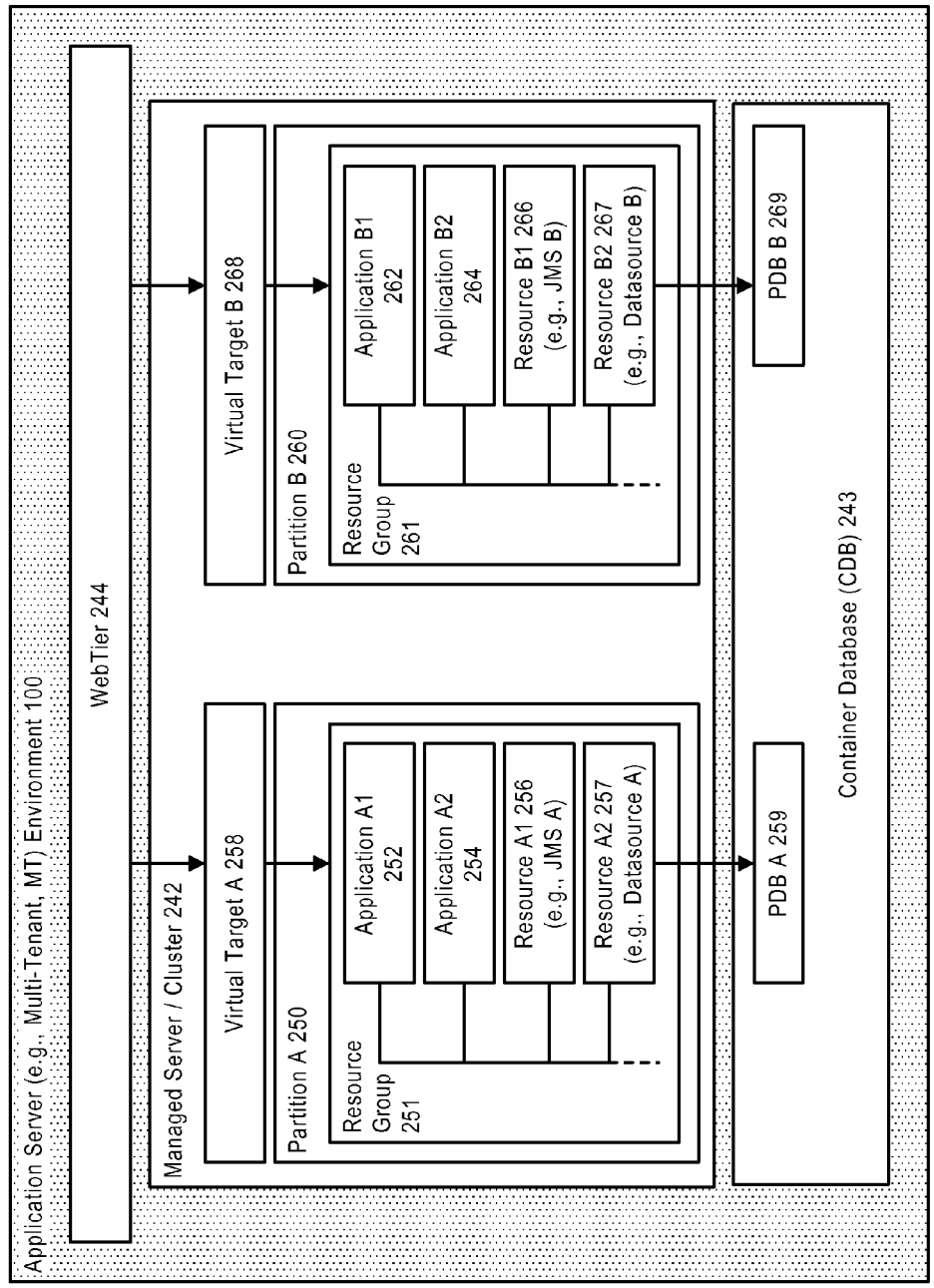
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC data source, JavaMail, WLDF, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for an application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRMDataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition.

Figure 4:
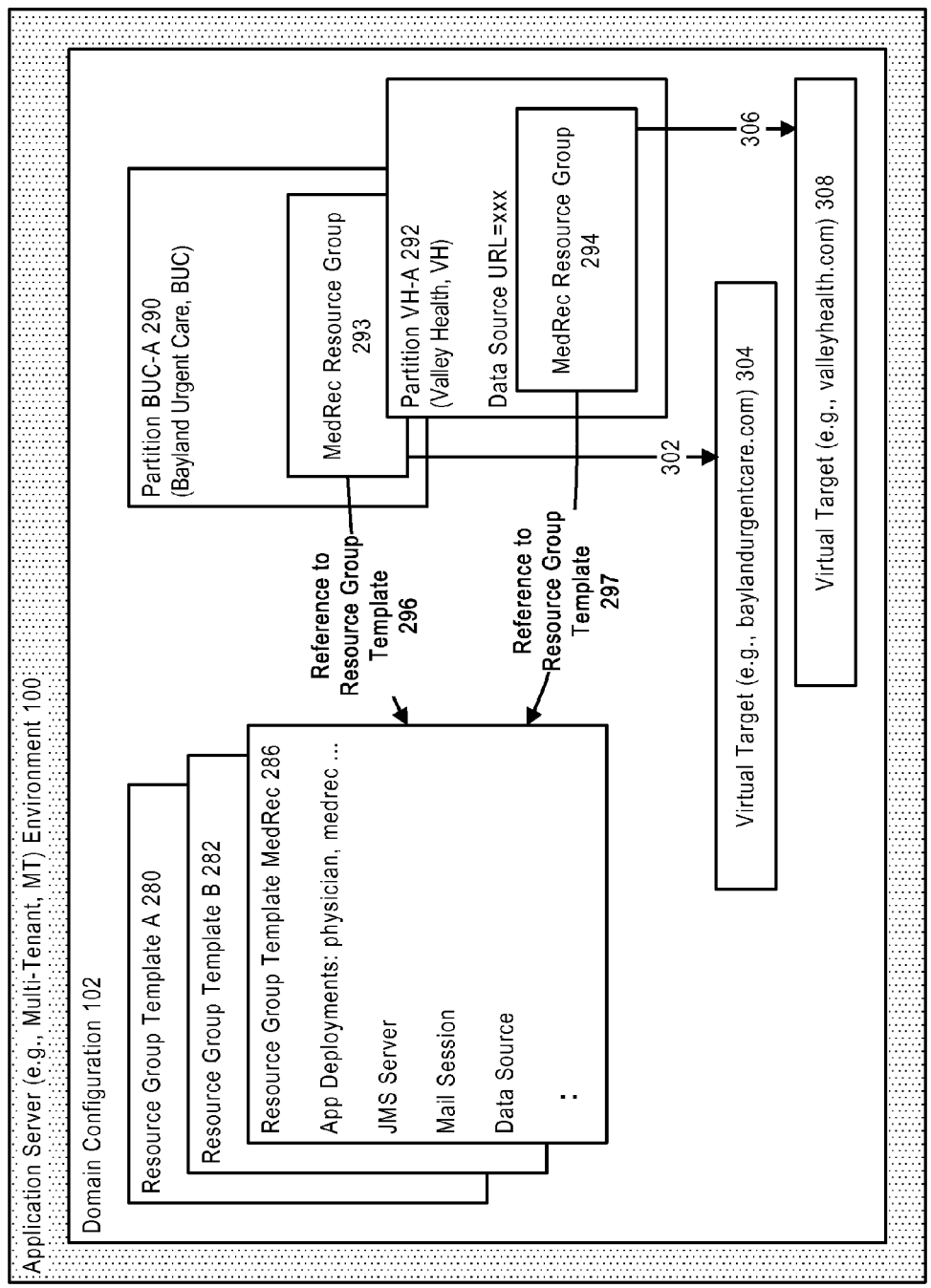
FIG. 4 illustrates a domain configuration for use with an exemplary multi-tenant environment, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and data sources, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition: <partitionName>/ <resource JNDI name>, or domain: <resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
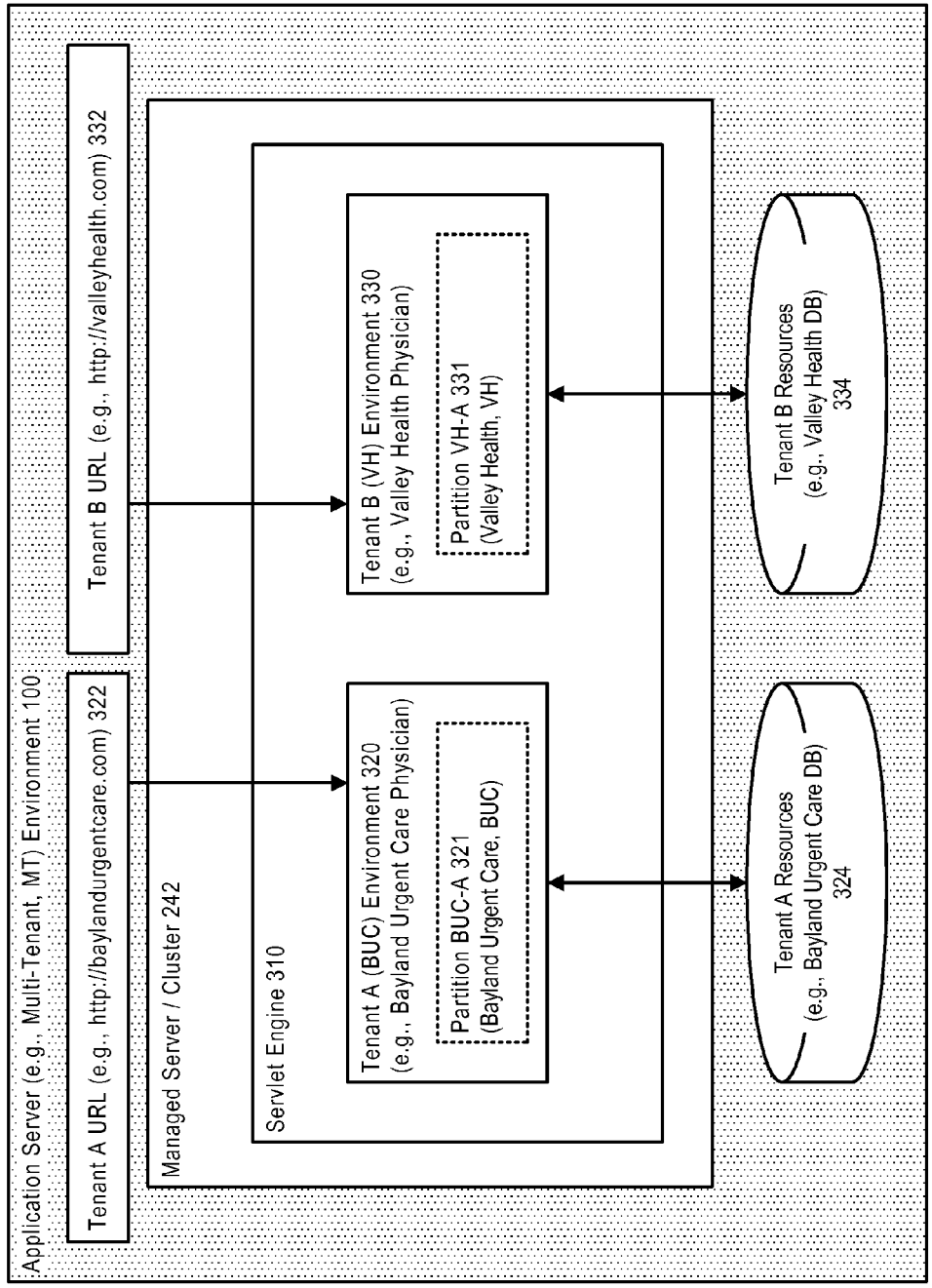
FIG. 5 further illustrates an exemplary multi-tenant environment, in accordance an embodiment.

FIG. 5 further illustrates an exemplary multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a bayland urgent care database, or a valley health database respectively. The database instances can use compatible schemas, since the same application code will execute against both databases. When the system starts the partitions, it can create the virtual targets and data sources to the respective database instances.

Data Sources

In an application server, for example a WebLogic application server, a user can configure database connectivity by adding data sources to an application domain. A data source can be an object that provides database access and database connection management. Each data source can contain a pool of database connections that are created when the data source object is created or at server startup. Applications can reserve a database connection from the data source by looking up the data source in a Java Naming and Directory Interface (JNDI) tree or in the local application context.

In accordance with an embodiment, a data source object can be created using vendor-specific mechanisms, such as commands, from a data source configuration, which can be specified using annotations or a deployment descriptor.

A data source object can include a set of properties that identify and describe a real-world database that it represents. These properties can include information such as the location of the database server, the name of the database, security credentials, and the network protocol to use to communicate with the database server.

As heavily used application resources, data sources need to support partition-based configuration, runtime monitoring, security, diagnostics, etc. to meet the general goals of multi-tenancy, examples of which can include reducing administrative overhead associated with managing multiple domains and application deployments, and improving density of deployments to reduce operational and infrastructure costs.

In accordance with an embodiment, described herein is a system and method for providing data sources in a multi-tenant application server environment. The system includes a an application server environment with a plurality of partitions and a resource group template referenced by a resource group in one or more of the plurality of partitions; and a data source configuration defined as part of the resource group template. The data source configuration can be overridden with attributes specific to a particular referencing partition. A data source subsystem can create a data source object in accordance with the overridden data source configuration, for use in creating connections to a database associated with the particular referencing partition, monitoring and diagnosing the data source object.

In accordance with an embodiment, a data source configuration defined in the referenced resource group template can be scoped to the partition that includes the referencing resource group. However, the data source configuration may lack a database URL or have an incorrect URL; and/or database credentials. As such, the data source configuration may need to be qualified with partition-specific JDBC attributes, and have the appropriate overrides specified for deployment to a runtime of the partition.

In accordance with an embodiment, a given data source configuration can only be referenced by a single resource group in a partition. Having multiple resource group references can result in a naming conflict at deployment time, similar to referencing a deployment descriptor from multiple domain-level system resources.

In accordance with an embodiment, a data source configuration can additionally be referenced from a resource group, either a domain-level resource group or a partition-level resource group. Such a referenced data source configuration needs to be qualified with appropriate credentials, URL, driver properties of the database to be connected to, and attributes of the intended scope (i.e. partition scope or domain scope).

In accordance with an embodiment, when a data source configuration defined in a resource group template is referenced by a partition-level resource group, a bean component (for example, JDBCSystemResourceOverride MBean) per data source configuration can be used to qualify that data source configuration. In addition, a deployment plan can be specified at the partition-level to qualify the referenced data source configuration. During processing of override attributes, the deployment plan is processed before applying the override attributes to the referenced data source configuration. When a given data source attribute is specified in both a deployment plan and an overriding bean, the latter takes precedence.

In accordance with an embodiment, a given data source descriptor (for example, config/jdbc/datasourcename-jdbc.xml) at a domain level can only be referenced by a single domain-level resource group. Otherwise, the same system resource would be deployed two or more times, resulting in potential naming conflicts, binding errors, etc. For example, having two domain-level resource group definitions that refer to a same data source descriptor is comparable to defining two domain-level system resources that reference the same data source descriptor. Additionally, as an overriding bean or a deployment plan as described above is available only at a partition level, overriding capability at the domain level is not supported.

At runtime, a data source subsystem can create a data source object in according with a data source configuration that has been qualified for a particular partition. A connection pool can be created using the data source object, to contain one or more connections to a pluggable database associated with the particular partition. An identifier of the particular partition and the data source object can be used to generate statistics associated with the data source object, for monitoring and diagnostic purposes.

Data Source Overriding

Figure 6:
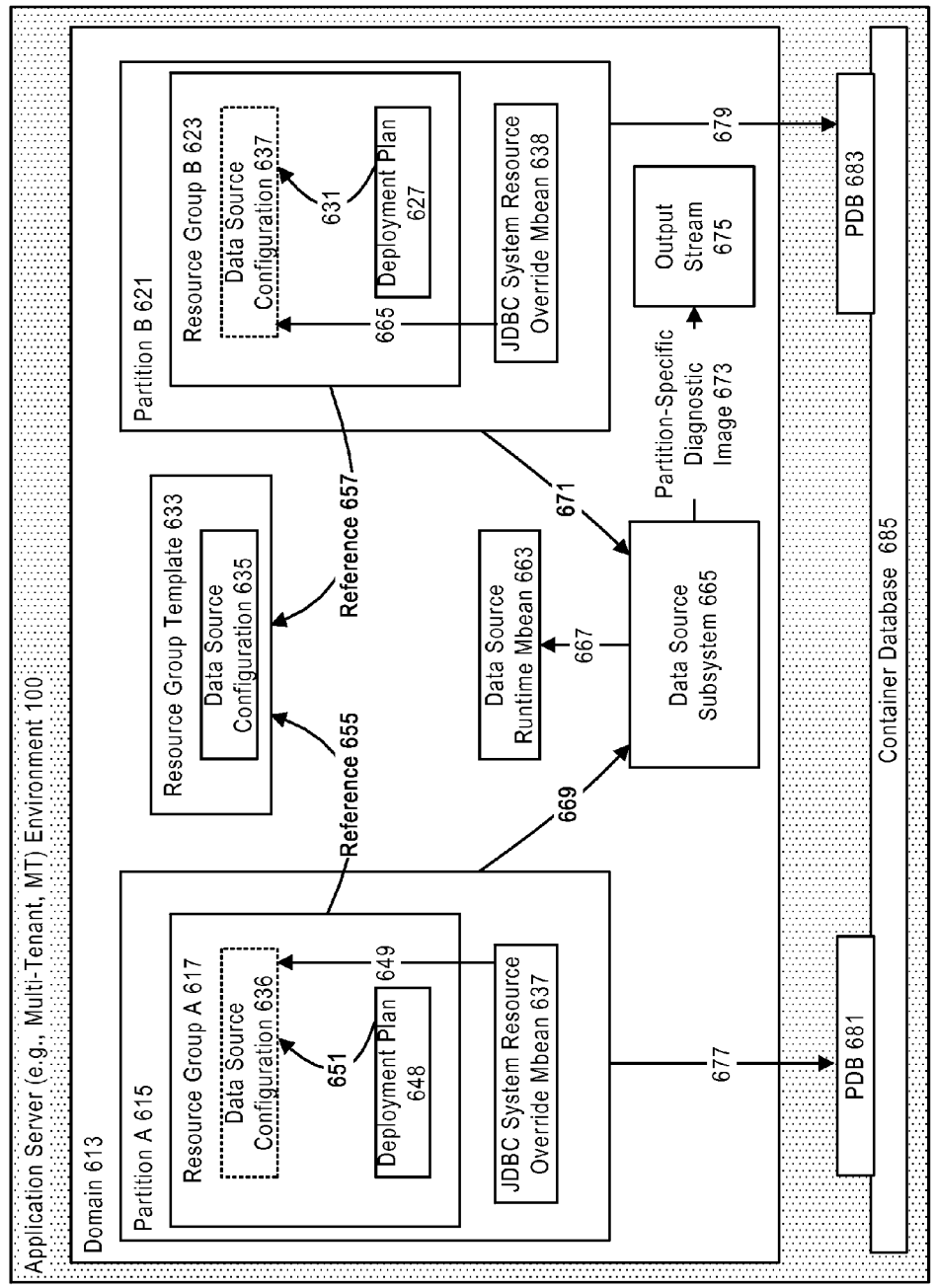
FIG. 6 illustrates a system for providing data sources for use in an application server, cloud, or other environment, in accordance with an embodiment.

FIG. 6 illustrates a system for providing data sources for use in an application server, cloud, or other environment, in accordance with an embodiment.

As shown in FIG. 6, the application server environment includes a domain 613, which further includes a plurality of partitions (for example, partition A 615 and partition B 621), and each partition is associated 677, 679 with a pluggable database (for example, PDB 681 and PDB 683 that are plugged into a container database 685).

In accordance with an embodiment, the domain can additionally include a resource group template 633, referenced 655, 657 respectively by a resource group (for example, resource group A 617 in partition A, and resource group B 623 in partition B in the domain).

As further shown in FIG. 6, a data source configuration 635 can be defined as part of the resource group template. The data source configuration can be specified in a data source descriptor file and referenced by the resource group template, similar to other system resource definitions.

In accordance with an embodiment, by referencing the resource group template, the referencing resource group in partition A and partition B can obtain at deployment time a copy (for example, data source configuration 636 and data source configuration 637) of the data source configuration defined in the resource group template. Each copy of the data source configuration can be qualified or overridden 649, 665 with partition-specific attributes using a configuration bean component (for example, JDBC system resource override Mbean 637 or JDBC system resource override Mbean 638).

For example, as each partition can be associated with a pluggable database, attributes such as the URL and settings of each PDB, a service to be connected to, and security credentials, can be overridden to be partition-specific.

In accordance with an embodiment, attributes in a JDBC system resource override Mbean instance can represent data source settings that can typically be qualified on a per-partition basis for SaaS use cases. In addition, the JDBC system resource override Mbean can qualify settings of databases from different vendors, for example MySQL and DB2, especially for PaaS use cases.

In accordance with an embodiment, each copy of the data source configuration can be additionally qualified or overridden 651, 631 with partition-specific attributes using a deployment plan (for example, deployment plan 648 and deployment plan 627). Each of the deployment plans can be specified for a resource group, and defined in an external file whose path is specified in a partition configuration. The deployment plans can be used to override arbitrary attributes of the data source configurations. During override processing, the deployment plans are processed before applying override MBean attributes to the data source configurations. If a given data source attribute is specified in both a deployment plan and an override MBean, the override MBean value takes precedence.

In accordance with an embodiment, a domain-level resource group can reference the data source configuration defined in the resource group template. As discussed above, only one domain-level resource group can reference this data source configuration. In addition, the domain-level resource group cannot override the data source configuration, as the two overriding approaches, i.e. using a deployment plan and using an override Mbean, are available only at a partition level.

In accordance with an embodiment, when an application-scoped data source configuration (for example, data source configuration) is defined in a partition-scoped resource group, the defining resource group needs to provide a deployment plan to appropriately qualify the data source attributes and driver properties for the partition.

Listing 1 illustrates how a JDBC system resource override Mbean is used in domain configuration file, to qualify a data source configuration, in accordance with an embodiment.

Listing 1

```
<domain>
...
    <partition>
    <name>ValleyHealth</name>
    <resource-group>
        <name>ValleyHealthMedRec</name>
        <resource-group-template>MedRecResourceTemplate</resource-group-
        template>
    </resource-group>
    <jdbc-system-resource-override>
        <name>MedRecGlobalDataSourceXAOverrides</name>
        <data-source-name>MedRecGlobalDataSourceXA</data-source-name>
        <url>jdbc:oracle:thin:@(DESCRIPTION=(ADDRESS_LIST=(ADDRESS=(PROTOCOL=TCP)
        (HOST=host.us.oracle.com)(PORT=5521)))(CONNECT_DATA=(SERVICE_NAME=cdb1_
        pdb2.regress.rdbms.dev.us.oracle.<user>VHuser</user>
        <password-encrypted>{AES}nb2nMgnPJpYa91JZj4K2f4NALY=</password-
        encrypted>
    </jdbc-system-resource-override>
    <resource-deployment-plan>/apps/plans/valley/plan.xml</resource-
    deployment-plan>
    </partition>
    <resource-group-template>
    <name>MedRecResourceTemplate</name>
    ...
        <jdbc-system-resource>
        <name>MedRecGlobalDataSourceXA</name>
        <descriptor-file-name>jdbc/MedRecGlobalDataSourceXA-9669-
        jdbc.xml</descriptor-file-name>
        </jdbc-system-resource>
    </resource-group-template>
    ...
</domain>
```

As shown in Listing 1, the JDBCSystemResourceOverride section of the partition configuration in the domain configuration file defines overrides of a data source (i.e. the MedRecGlobalDataSourceXA). The configuration of the data source is specified in a resource group template (i.e. MedRecResourceTemplate) which is referenced by a partition's resource group (i.e. ValleyHealthMedRec).

Listing 2 illustrates an example data source configuration specified in a source group template in accordance with an embodiment.

Listing 2

```
<jdbc-data-source>

<name>MedRecGlobalDataSourceXA</name>

<jdbc-driver-params>

<driver-name>oracle.jdbc.xa.client.OracleXADataSource</driver-name>

</jdbc-driver-params>

<jdbc-connection-pool-params>
            <test-table-name>SQL SELECT 1 FROM DUAL</test-table-name>
        </jdbc-connection-pool-params>
        <jdbc-data-source-params>
            <jndi-name>jdbc/MedRecGlobalDataSourceXA</jndi-name>
            <global-transactions-protocol>TwophaseCommit</global-transactions-protocol>
        </jdbc-data-source-params>
</jdbc-data-source>
```

As shown in Listing 2, the data source configuration does not have all the attributes needed to connect to a database and may need to be overridden using partition-specific attributes.

For example, the URL, user and password are missing. The missing attributes can be provided using a deployment plan or an override bean component as discussed above.

Listing 3 below illustrates an example deployment plan in accordance with an embodiment.

---

Listing 3

---

```
<deployment-plan>
...
    <variable-definition>
        <variable>
            <name>JDBCConnectionPoolParams_MaxCapacity_14000028166751</name>
            <value>100</value>
        </variable>
    </variable-definition>
    <module-override>
    ...
        <module-descriptor external="true">
        ...
            <uri>MedRecGlobalDataSourceXA-9669-jdbc.xml</uri>
            <variable-assignment>
                <name>JDBCConnectionPoolParams_MaxCapacity_14000028166751</name>
                <xpath>/jdbc-data-source/jdbc-connection-pool-params/max-
                capacity</xpath>
            </variable-assignment>
        </module-descriptor>
    </module-override>
</deployment-plan>
```

---

The example deployment plan illustrated in Listing 3 is referenced by the domain configuration file illustrated in Listing 1, and demonstrates changing the MaxCapacity attribute of the data source configuration illustrated Listing 2.

In accordance with an embodiment, a data source subsystem 665 can create data source objects using 669, 671 the overridden data source configurations from partition A and partition B. The created data source objects can be used to create connections pools that include JDBC connections to configured databases.

In accordance with an embodiment, a data source object or instance can be bound into an appropriate JNDI context at deployment time under a name specified in the data source configuration.

For example, a data source defined in an application can be bound to an application JNDI namespace, and a data source defined in a domain-level resource group or referenced by the domain-level resource group can be bound to a global JNDI namespace.

In accordance with an embodiment, a data source object obtained from a JNDI namespace preserves its scope when accessed under a different partition context. As such, a partition cannot see a data source defined in another partition or at a domain level.

In accordance with an embodiment, a data source defined in one partition can be configured to enable the data source's JNDI binding visible in other partitions.

For example, a connection property (for example, weblogic.jdbc.crossPartitionEnabled) on a data source can be set to indicate that cross-partition JNDI access is allowed. Similarly, a JNDI binding of a domain-level data source can be made visible to individual partitions by setting the cross-partition connection property.

In accordance with an embodiment, each data source bound to a JNDI tree can be qualified by a partition name associated with the data source. This qualification can be used to look up a target data source.

For example, as further shown in FIG. 6, a data source runtime Mbean 663 can be used to selectively monitor data source objects associated with a particular partition based on an identifier (for example, name) of the partition. The partition identifier can also be used for generating partition-specific diagnostic image that can be output 673 to a specified output stream 675.

Data Source Monitoring

Figure 7:
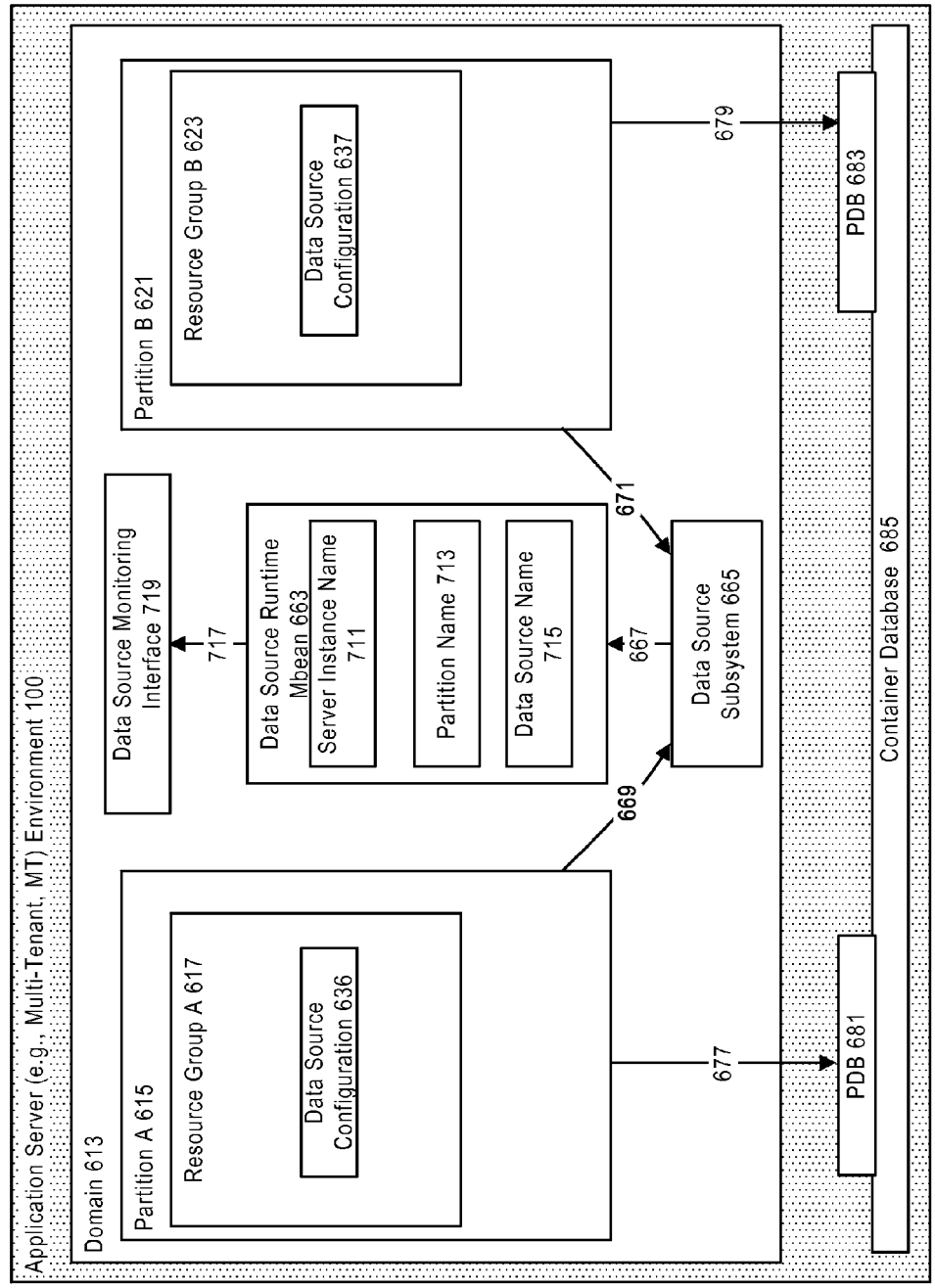
FIG. 7 further illustrates a system for providing data sources for use in an application server, cloud, or other environment, in accordance with an embodiment.

FIG. 7 further illustrates a system for providing data sources for use in an application server, cloud, or other environment, in accordance with an embodiment.

As shown in FIG. 7, the data source runtime Mbean can include properties to identify a data source object in a particular partition for monitoring. For example, these properties can include server instance name 711, partition name 713 and data source name 715.

In accordance with an embodiment, partition-scoped data source runtime MBeans can have a name attribute like com.bea:ServerRuntime=myserver,Name=ds1, Type=JDBCDataSourceRuntime,PartitionRuntime=p. The parent attribute of the name attribute can be set to com.bea: ServerRuntime=myserver, Name-p1, Type=PartitionRuntime. In the above examples, the partition-scoped data source name is "ds1", the partition name is "p1" and the server name is "myserver".

The name properties can be used 717 at a monitoring interface (for example, data source monitoring interface 719) at an administration console, to identify a data source object for monitoring. Runtime statistics of the identified data source object can be populated from the data source runtime bean for displaying at the monitoring interface.

For example, the runtime statistics can include the scope of the data source, the server instance the data source is deployed, its state (running or stopped), active connection counts, and current capacity.

Diagnostics

Figure 8:
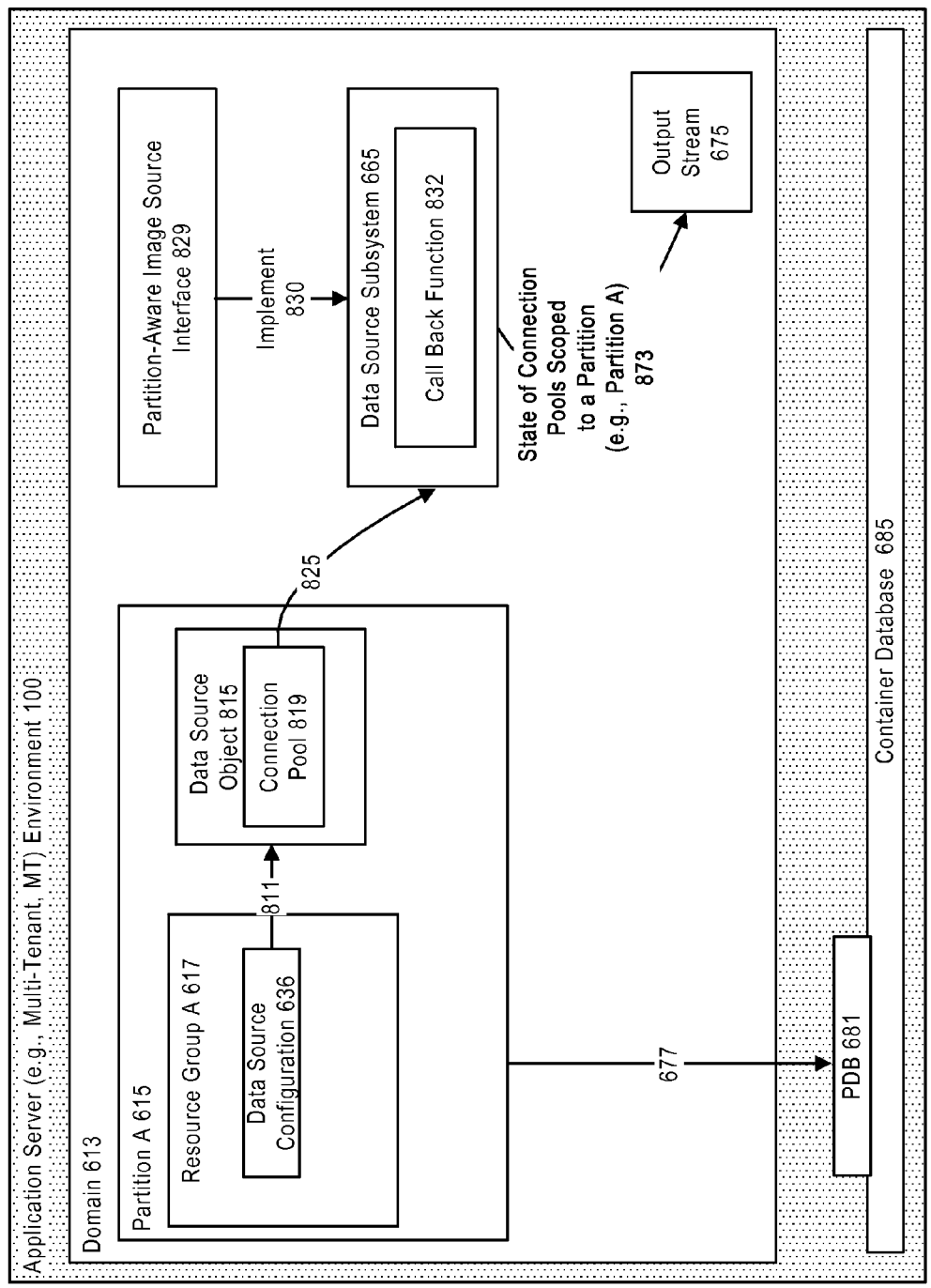
FIG. 8 further illustrates a system for providing data sources for use in an application server, cloud, or other environment, in accordance with an embodiment.

FIG. 8 further illustrates a system for providing data sources for use in an application server, cloud, or other environment, in accordance with an embodiment.

As shown in FIG. 8, the data source subsystem can create a diagnostic image that including states of connection pools specific to a particular partition, and output the diagnostic image to a specified output stream for analysis.

In accordance with an embodiment, a data source object (for example, data source object 815) can be created by the data source subsystem for the data source configurations in partition A. The created data object can include a connection pool (for example, connection pool 819).

As further shown in FIG. 8, the data source subsystem can implement 830 a partition-aware image source interface 829 (for example, weblogic.diagnostics.image.PartitionAware-ImageSource) that can limit diagnostic image creation to those resources scoped to a specific partition. With the implementation, the data source subsystem can include a call back function 832 (for example, createDiagnosticImage( )) that takes a partition name and an output stream as parameters. Upon receiving a callback with the required parameters, the data source subsystem can write connection pool states of the connection pools in the partition 873 to the specified output stream.

FIG. 9 illustrates a method for providing data sources for use in an application server, cloud, or other environment, in accordance with an embodiment.

As shown in FIG. 9, at step 911, an application server environment executing on a computer including a microprocessor can be provided, wherein the application server environment includes a domain with a plurality of partitions and a resource group template referenced by one or more of the plurality of partitions.

At step 913, a data source configuration can be defined as part of the resource group template.

At step 915, the data source configuration can be overridden with attributes specific to a particular referencing partition.

At step 917, a data source object can be created using the overridden data source configuration, for use in creating connections to a database associated with the particular referencing partition, monitoring and diagnosing the data source object.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for supporting data sources in a multitenant application server environment, comprising:
   a computer that includes a microprocessor;
   an application server environment, executing on the computer, that includes an application server domain defined at runtime by a configuration file,
   wherein the application server domain includes
      a plurality of partitions, wherein each of the plurality of partitions represents a subdivision of the domain, wherein the subdivision provides a runtime for use by a tenant of the multitenant application server environment, and
      a resource group template referenced by one or more of the plurality of partitions, wherein each of the one or more referencing partitions defines attributes specific to the referencing partition;
   a data source configuration, defined as part of the resource group template that provides a template for creating data source objects;
   a management bean, in the application server environment, that operates to override the data source configuration with attributes specific to a particular referencing partition; and
   a data source subsystem that uses the overridden data source configuration to create a data source object, for use in creating connections to a database associated with the particular referencing partition.

2. The system of claim 1, further comprising
   a runtime bean component that generates statistics specific to the data source object for use in monitoring the data source object.

3. The system of claim 1, wherein the data source subsystem implements a partition-aware interface, and upon receiving a callback function with a name of the particular referencing partition, write a state of a connection pool created using the data source object to a specified output stream.

4. The system of claim 1, wherein the data source configuration is copied to a resource group in the particular referencing partition.

5. The system of claim 1, wherein the attributes specific to the particular referencing partition include database connectivity attributes and attributes for use in turning the connections.

6. The system of claim 1, wherein the data source object is configured to be accessed by resources in a different partition.

7. The system of claim 6, wherein a cross-partition property on the data source object is used to bind the data source object to a Java Naming and Directory Interface (JNDI) tree for the data source to be visible in the different partition.

8. A method for supporting data sources in a multitenant application server environment, comprising:
   configuring an application server environment executing on a computer including a microprocessor, wherein the application server environment includes an application server domain defined at runtime by a configuration file,
   wherein the application server domain includes
      a plurality of partitions, wherein each of the plurality of partitions represents a subdivision of the domain, wherein the subdivision provides a runtime for use by a tenant of the multitenant application server environment, and a resource group template referenced by one or more of the plurality of partitions, wherein each of the one or more referencing partitions defines attributes specific to the referencing partition;

defining a data source configuration as part of the resource group template, wherein the data source configuration provides a template for creating data source objects;

overriding, using a management bean in the application server environment, the data source configuration with attributes specific to a particular referencing partition; and creating, by a data source subsystem, a data source object using the overridden data source configuration, wherein the data source object is used to create connections to a database associated with the particular referencing partition.

9. The method of claim 8, further comprising providing a runtime bean component that generates statistics specific to the data source object for use in monitoring the data source object.

10. The method of claim 8, wherein the data source subsystem implements a partition-aware interface, and upon receiving a callback function with a name of the particular referencing partition, write a state of a connection pool created using the data source object to a specified output stream.

11. The method of claim 8, wherein the data source configuration is copied to a resource group in the particular referencing partition.

12. The method of claim 8, wherein the attributes specific to the particular referencing partition include database connectivity attributes and attributes for use in turning the connections.

13. The method of claim 8, wherein the data source object is configured to be accessed by resources in a different partition.

14. The method of claim 13, wherein a cross-partition property on the data source object is used to bind the data source object to a Java Naming and Directory Interface (JNDI) tree for the data source to be visible in the different partition.

15. A non-transitory computer readable storage medium, including instructions stored thereon which when read and executed by one or more computers cause the one or more computers to perform the steps comprising:

configuring an application server environment executing on a computer including a microprocessor, wherein the application server environment includes an application server domain defined at runtime by a configuration file, wherein the application server domain includes a plurality of partitions, wherein each of the plurality of partitions represents a subdivision of the domain, wherein the subdivision provides a runtime for use by a tenant of the multitenant application server environment, and a resource group template referenced by one or more of the plurality of partitions, wherein each of the one or more referencing partitions defines attributes specific to the referencing partition;

defining a data source configuration as part of the resource group template, wherein the data source configuration provides a template for creating data source objects;

overriding, using a management bean in the application server environment, the data source configuration with attributes specific to a particular referencing partition; and creating, by a data source subsystem, a data source object using the overridden data source configuration, wherein the data source object is used to create connections to a database associated with the particular referencing partition.

16. The non-transitory computer readable storage medium of claim 15, further comprising providing a runtime bean component that generates statistics specific to the data source object for use in monitoring the data source object.

17. The non-transitory computer readable storage medium of claim 15, wherein the data source subsystem implements a partition-aware interface, and upon receiving a callback function with a name of the particular referencing partition, write a state of a connection pool created using the data source object to a specified output stream.

18. The non-transitory computer readable storage medium of claim 15, wherein the data source configuration is copied to a resource group in the particular referencing partition.

19. The non-transitory computer readable storage medium of claim 15, wherein the attributes specific to the particular referencing partition include database connectivity attributes and attributes for use in turning the connections.

20. The non-transitory computer readable storage medium of claim 15, wherein the data source object is configured to be accessed by resources in a different partition.

* * * * *

UNITED STATES PATENT AND TRADEMARK OFFICE
CERTIFICATE OF CORRECTION

PATENT NO. : 9,967,324 B2  
APPLICATION NO. : 14/857451  
DATED : May 8, 2018  
INVENTOR(S) : Somogyi et al.

Page 1 of 1

It is certified that error appears in the above-identified patent and that said Letters Patent is hereby corrected as shown below:

In the Claims

Column 16, Line 23, Claim 1, delete "template" and insert -- template, --, therefor.

Signed and Sealed this  
Thirteenth Day of November, 2018

Andrei Iancu  
*Director of the United States Patent and Trademark Office*